May 30, 1967 A. F. HANKEN 3,323,049
SYSTEM FOR QUANTITATIVELY MEASURING A PROPERTY OF DIELECTRIC
MATERIAL BY APPLYING INPUT SIGNALS AT TWO DIFFERENT
FREQUENCIES TO A CAPACITANCE PROBE AND VARYING THE
FREQUENCY OF ONE INPUT SIGNAL TO MAINTAIN A
CONSTANT RATIO OF OUTPUT SIGNALS FOR THE
TWO FREQUENCIES
Original Filed March 19, 1962
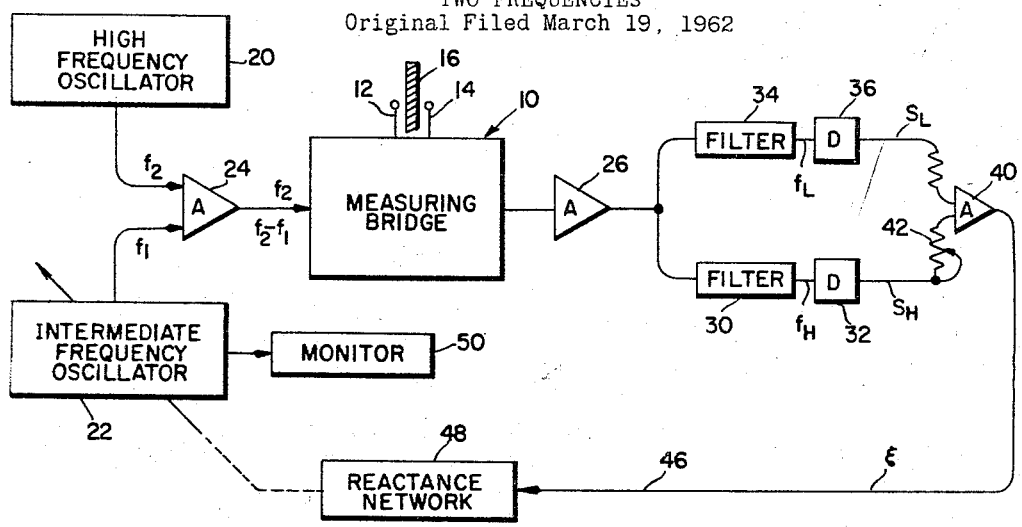
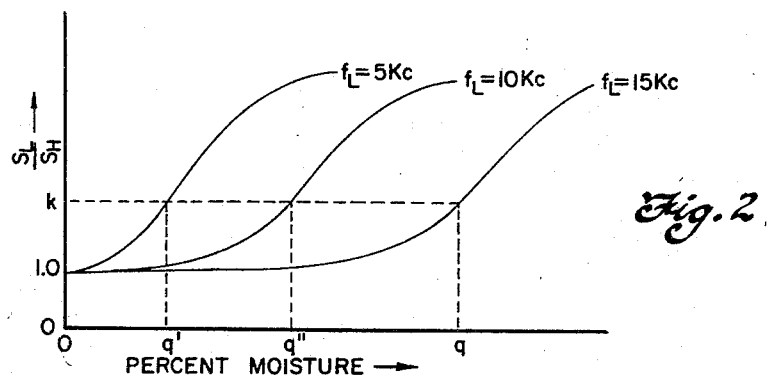
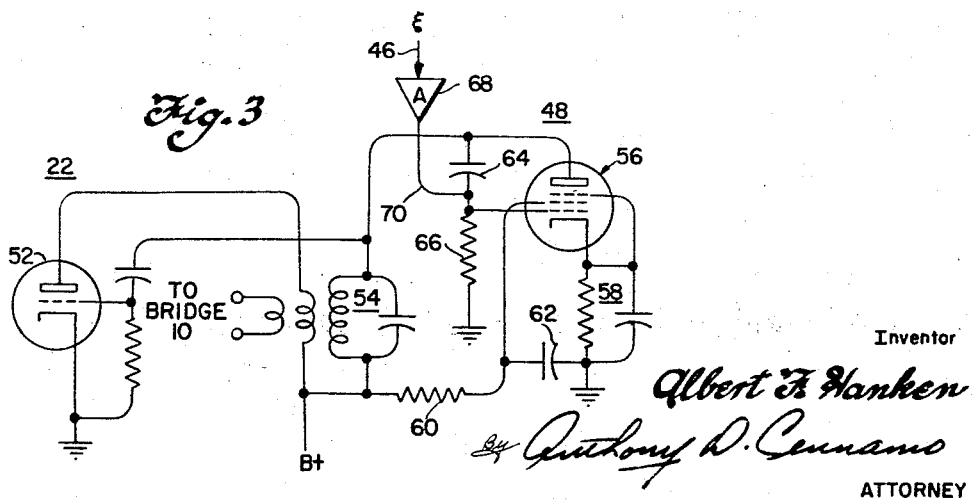
Inventor
Albert F. Hanken
By Anthony D. Cennamo
ATTORNEY

United States Patent Office 3,323,049
Patented May 30, 1967

3,323,049
SYSTEM FOR QUANTITATIVELY MEASURING A PROPERTY OF DIELECTRIC MATERIAL BY APPLYING INPUT SIGNALS AT TWO DIFFERENT FREQUENCIES TO A CAPACITANCE PROBE AND VARYING THE FREQUENCY OF ONE INPUT SIGNAL TO MAINTAIN A CONSTANT RATIO OF OUTPUT SIGNALS FOR THE TWO FREQUENCIES
Albert F. Hanken, Atlanta, Ga., assignor to Industrial Nucleonics Corporation, a corporation of Ohio
Continuation of application Ser. No. 180,786, Mar. 19, 1962. This application Dec. 7, 1965, Ser. No. 528,667
9 Claims. (Cl. 324—61)

This is a continuation of my copending application Ser. No. 180,786, filed Mar. 19, 1962, now abandoned.

This invention relates to a system for measuring the properties of dielectric materials, and more particularly it relates to moisture gauges and an improved dual frequency moisture measuring circuit.

In the past, the moisture content of a material has been measured by subjecting the material to two signals of different frequency and measuring the complex dielectric constant of the material at each frequency. This dielectric constant is not the same for all moisture contents and for all frequencies. It is found that the amount of moisture affects the ratio of the low frequency measurement to the high frequency measurement.

The measurements are performed in a bridge circuit. As the moisture of the material changes, the bridge becomes unbalanced and it is possible to shift the frequency of the low frequency input signal to balance the bridge. It is not uncommon for a shift of several kilocycles per second to be required when measuring moisture contents up to 15–20 percent. Bridge unbalance is detected by an error sensor and an electromechanical feedback loop serves to effect the required shift in the low frequency to enable bridge balance. The above technique is described in detail in my copending application Ser. No. 107,794, filed May 4, 1961, now Patent No. 3,155,901.

The disadvantages of this method are overcome by the present invention which in a preferred embodiment provides a dual frequency moisture measuring system, the low frequency input of which is provided by beating the high frequency signal with another signal of an intermediate frequency to obtain a signal of a difference frequency. The ratio of the bridge response to both the difference frequency and the high frequency signal inputs is computed, and whenever the computed ratio differs from a predetermined value the intermediate frequency is shifted to provide the difference beat frequency required for bridge balance.

Accordingly, it is a primary object of the present invention to provide a dual-frequency moisture measuring system which responds to a wider range of moisture contents than similar devices used heretofore.

It is another object of the present invention to provide a measuring system which is stable and possesses improved frequency adjusting characteristics.

It is still another object of the present invention to provide a moisture gauge which exhibits improved signal-to-noise characteristics.

It is yet another object of the present invention to provide a measuuring system not dependent on electromechanical feedback expedients.

These and other advantages of the present invention will become more apparent upon reference to the following description taken in conjunction with the drawings, in which:

FIG. 1 is a block diagram of a measuring system in accordance with the present invention;

FIG. 2 is a graph of detected response to percent moisture useful in explaining the operation of the system shown in FIG. 1; and FIG. 3 is a schematic circuit diagram of a preferred electronic feedback circuit for use in the system of FIG. 1.

Referring to the drawings and specifically to FIG. 1, the system of the present invention includes a frequency independent bridge network as shown generally at 10. One type is illustrated in copending application Ser. No. 268,268, now Patent No. 3,290,588, originally Ser. No. 174,748, filed by Alan Norwich Feb. 21, 1962, now abandoned, and assigned to the same assignee. The bridge may include a pair of electrodes 12, 14 between which the material 16 to be measured is placed. The electrodes and material may comprise a capacitive element of one arm of the bridge 10.

The input to the bridge is provided by a high frequency oscillator 20 having an output frequency $f_2$, and adjustable intermediate frequency oscillator 22 having an output frequency $f_1$ and a broad-banded amplifier 24 for receiving the oscillator outputs. Through conventional heterodyne action the following frequencies comprise the output of amplifier 24: high frequency component of frequency $f_2$, and a difference beat signal of frequency $f_L = f_2 - f_1$.

The output of the bridge 10 is coupled to an amplifier 26 which drives a pair of filtering and detecting networks. A band pass filter 30 passes signals of a frequency $f_2 = f_H$ onto a detector 32 for rectification. A band pass filter 34 passes only the difference beat frequency $f_L = f_2 - f_1$ to a similar detector 36 associated therewith. Other frequencies that may be included in the output of the amplifier 24 are not passed by either filter. The detectors 32, 36 provide D.C. signals $S_H$ and $S_L$ of a magnitude proportional to the amplitude of the bridge response to frequencies $f_H$ and $f_L$ respectively. A summing operational amplifier 40 having an input resistor 42 is connected to the detector outputs to perform the following mathematical relation $$kS_H - S_L = \xi \qquad (1)$$

where $k$ can be adjusted by means of an input potentiometer 42 and $\xi$ comprises an error signal fed back on line 46 to a reactance network 48.

Referring now to FIG. 2, it is observed that if $f_H$ and $f_1$ are fixed at 200 kc. and 185 kc. respectively, $f_L = 15$ kc., $\xi$ is zero, i.e.

$$\frac{S_L}{S_H} = k$$

only when the material being measured contains approximately $q$ percent moisture. Should the material vary about this percent moisture, $S_L/S_H$ becomes different from $k$ and an error signal $\xi$ results. The magnitude and polarity of the error signal affects the reactance network 48 in a manner described hereinafter to alter the intermediate frequency $f_1$ which in turn alters $f_L$. From the graphs it may be observed that to maintain the ratio constant in the preferred manner, the difference beat frequency $f_L$ must be decreased 10 kc. to measure a small percent moisture, i.e., $f_1$ must be increased to 190 kc. As an example, with the present invention, a shift of $$\frac{195 \text{ kc} - 185 \text{ kc}}{185 \text{ kc}} \times 100 = 5.6\%$$

of the output frequency $f_1$ of the intermediate midfrequency oscillator 22 is necessary to maintain a constant $k$ when the moisture varies from $q$ to $q'$ percent.

Now, assuming a change in moisture content to a value approaching $q''$ percent, the error signal on line 46 causes the network 48 to increase the intermediate frequency $f_1$ to a value within 10 kc. of the high frequency. The output of amplifier 40 should then go to zero as the $S_L/S_H$ ratio is identically equal to $k$. The value of $$k = \frac{S_L}{S_H}$$

should not be made too small. For example, if $k=1.05$, $S_L=1.05\ S_H$ and a small amount of noise in one of the two channels could change this ratio. On the other hand, $k$ should not be made too high, as $S_L$ will be much larger than $S_H$, overdriving amplifier 26 or 40. In practice a value for $k$ of 1.5 to 2.0 is found to be satisfactory, though any convenient value for $k$ may be used.

A monitor 50 may be coupled to the output of the intermediate frequency oscillator 22 to register the output frequency thereof. Monitor 50 could comprise a multivibrator-actuated counter or other frequency meter for indicating percent moisture directly. It may be necessary to adjust the band pass filter 34 if the frequencies $f_L$ and $f_H$ lie rather close in the frequency domain, since some high frequency information may then contribute to the signal $S_L$.

With reference to FIG. 3, the intermediate frequency oscillator 22 comprises a triode 52 driving a tank circuit 54. The tank circuit 54 is shunted by a reactance tube 56 self-biased as indicated at 58 and having a screen dropping resistor 60 and decoupling capacitor 62. A capacitor 64 and resistor 66 connected between the anode and cathode elements of tube 56 comprise a quadrature circuit which causes a 90° phase difference between the plate current and the plate voltage of tube 56. With the circuit shown, the effect is one of shunting the tank circuit 54 with a resistance and capacitance whose values depend on the mutual transconductance $g_m$ of the tube 56.

In the operation of the circuit, an error signal is amplified by an amplifier 68 and a D.C. signal is applied over line 70 to the control grid of tube 56. The mutual transconductance $g_m$ varies with the bias on the tube and the effective value of shunting capacitance is changed accordingly. If the shunting capacitance is increased, the tank circuit resonates at a lower intermediate frequency and an increase in $f_L$ results. The overall gain of the electronic feedback system shown may be adjustable by varying the gain of amplifier 68.

Other reactance tube circuits may be used. The operation of such circuits to control the frequency of an oscillator is well known, as described in "Vacuum Tube Circuits" by Lawrence Baker Arguimbau, John Wiley & Sons, Inc., New York, 1948, at page 467.

While certain and specific embodiments of the invention have been described herein, many changes and modifications may be made thereto without departing from the true spirit and scope of the invention as set forth in the appended claims.

I claim:

1. In a measuring system for determining one or more physical properties of a material by simultaneously subjecting said material to a high frequency signal and a low frequency signal in a capacitive bridge circuit having an input and an output, the improvement comprising a first oscillator providing a first signal at said high frequency, a second oscillator providing a second signal at a second signal frequency, means for combining said first signal and said second signal to produce a first input signal at said high frequency and a second input signal at a difference frequency equal to the difference between said high frequency and said second signal frequency, said difference being equal to said low frequency, means for coupling said first and second input signals to said bridge circuit input, means connected to said bridge output for selectively detecting separate components of bridge output signals at said high and said low frequencies respectively, means responsive to said separate components for generating a comparison signal indicative of the ratio of said components, and means responsive to said comparison signal for shifting said second signal frequency of said second oscillator to maintain said comparison signal substantially constant.

2. The measuring system as set forth in claim 1 which further includes means for monitoring the frequency of said second oscillator as an indication of one of said physical properties.

3. The measuring system as set forth in claim 1 in which said selective detecting means includes a filter for selectively passing said high frequency component and a filter for selectively passing said difference frequency component.

4. The measuring system as set forth in claim 1 in which said frequency shifting means includes at least one frequency determining tank circuit having a variable capacitor, and electronic circuit means responsive to the magnitude of said comparison signal for varying the capacitance of said variable capacitor.

5. The measuring system as set forth in claim 4 in which said electronic circuit means comprises a reactance tube and amplifier means responsive to said comparison signal for biasing said reactance tube in accordance with the magnitude of said comparison signal.

6. In a measuring system for determining a property of a dielectric material, a first oscillator for providing a first signal at a first frequency, a second oscillator for providing a second signal at a second frequency, means for combining said first and second signals to provide a third signal at a third frequency which is different from said first and second frequencies and resulting from the combination thereof, detecting means, a capacitive probe for coupling said third signal to at least a portion of said material and for coupling said detecting means to said portion, said detecting means including means for deriving a fourth signal which is a function of said third signal as it is modified by the dielectric properties of said material portion coupled to said probe, and means responsive to changes in said fourth signal for shifting the frequency of said second oscillator to thereby change the frequency of said third input signal coupled to said probe.

7. The measuring system as set forth in claim 6 which further includes means for monitoring the frequency of said second oscillator as an indication of one of said physical properties.

8. The measuring system as set forth in claim 6 in which said frequency shifting means includes at least one frequency determining tank circuit having a variable capacitor, and electronic circuit means responsive to the magnitude of said fourth signal for varying the capacitance of said variable capacitor.

9. The measuring system as set forth in claim 8 in which said electronic circuit means comprises a reactance tube and amplifier means responsive to said fourth signal for biasing said reactance tube in accordance with the magnitude of said fourth signal.

References Cited

FOREIGN PATENTS

| 217,898 | 10/1958 | Australia. |
| 622,470 | 5/1949 | Great Britain. |
| 628,615 | 9/1949 | Great Britain. |

WALTER L. CARLSON, *Primary Examiner.*

E. E. KUBASIEWICZ, *Assistant Examiner.*